US007128354B2

United States Patent
Wu

(10) Patent No.: US 7,128,354 B2
(45) Date of Patent: Oct. 31, 2006

(54) APPARATUS FOR SUPPORTING A VIDEO CAMERA

(76) Inventor: Chin-Chang Wu, No. 9, Alley 12, Lane 108, Yungfeng Rd., Taiping City, Taichung Hsien (TW)

( * ) Notice: Subject to any disclaimer, the term of this patent is extended or adjusted under 35 U.S.C. 154(b) by 78 days.

(21) Appl. No.: 10/849,934

(22) Filed: May 21, 2004

(65) Prior Publication Data

US 2005/0258660 A1    Nov. 24, 2005

(51) Int. Cl.
*G03B 17/00* (2006.01)
(52) U.S. Cl. .................... 294/139; 248/187.1; 396/419
(58) Field of Classification Search ................ 294/139, 294/141; 396/419–422, 425, 429; 352/243; D16/242, 243; 248/177.1, 178.1, 179.1, 248/187.1
See application file for complete search history.

(56) References Cited

U.S. PATENT DOCUMENTS

| 2,483,711 A * | 10/1949 | Roos .......................... 396/426 |
| 4,727,390 A * | 2/1988 | Brown ......................... 396/420 |
| 5,332,136 A * | 7/1994 | Rudolph ....................... 224/185 |
| 5,650,821 A * | 7/1997 | Hewlett ........................ 348/373 |
| 5,839,704 A * | 11/1998 | Appleman ................... 248/178.1 |
| 2004/0076421 A1 * | 4/2004 | Linnecke ..................... 396/419 |
| 2005/0061933 A1 * | 3/2005 | Barth ....................... 248/178.1 |

* cited by examiner

*Primary Examiner*—Eileen D. Lillis
*Assistant Examiner*—Esther Onyinyechi Okezie
(74) *Attorney, Agent, or Firm*—Rosenberg, Klein & Lee

(57) ABSTRACT

An apparatus for supporting a video camera includes a camera mounting bracket, a front handle assembly and a rear handle assembly. The camera mounting bracket has an L-shaped profile and includes a handle mounting shelf and a camera mounting shelf. The camera mounting shelf and the front handle assembly are attached to the front of the handle mounting shelf. The rear handle assembly is attached to the rear of the handle mounting shelf at a position between the front handle assembly and the camera mounting shelf. Consequently, the apparatus will help a person to firmly hold a video camera when using the video camera to record scenes, regardless of different heights of view.

6 Claims, 8 Drawing Sheets

APPARATUS FOR SUPPORTING A VIDEO CAMERA

BACKGROUND OF THE INVENTION

1. Field of the Invention

The present invention relates to an apparatus to assist holding video cameras, and more particularly to an apparatus for holding and supporting a video camera that helps a person to hold firmly the video cameras for different applications or occasions.

2. Description of Related Art

Video cameras, like digital video cameras have become especially popular in the recent years. Also, the popular video cameras have become miniaturized yet so versatile that ordinary people can easily take such a camera anywhere and shoot very high quality movies. In general, the video cameras should be held in a stable state while recording video or motion pictures of a scene.

For different applications or occasions, the video cameras may need to be raised or lowered in order to record the video or motion pictures of objects at high or low places relative to human's normal height. Simply using hands to hold the video cameras cannot achieve the stability requirement or meet the demands specific heights. The quality of the video recordings will be disappointing in such a situation and so the camera user will feel sadness in the ownership of the camera.

To overcome the shortcomings, the present invention provides an apparatus for supporting a video camera to mitigate or obviate the aforementioned problems.

SUMMARY OF THE INVENTION

The main objective of the invention is to provide an apparatus for supporting a video camera to help a person to hold firmly a video camera and to enable the camera to be held at certain required heights.

An apparatus for supporting a video camera includes a camera mounting bracket, a front handle assembly and a rear handle assembly. The camera mounting bracket has an L-shaped profile and includes a handle mounting shelf and a camera mounting shelf. The camera mounting shelf and the front handle assembly are attached to the front of the handle mounting shelf. The rear handle assembly is attached to the rear of the handle mounting shelf at a position between the front handle assembly and the camera mounting shelf. Consequently, the apparatus for supporting a video camera will help a person to firmly hold a video camera when using the video camera to record scenes, regardless of different heights of view.

Other objectives, advantages and novel features of the invention will become more apparent from the following detailed description when taken in conjunction with the accompanying drawings.

DETAILED DESCRIPTION OF PREFERRED EMBODIMENT

Figure 1:
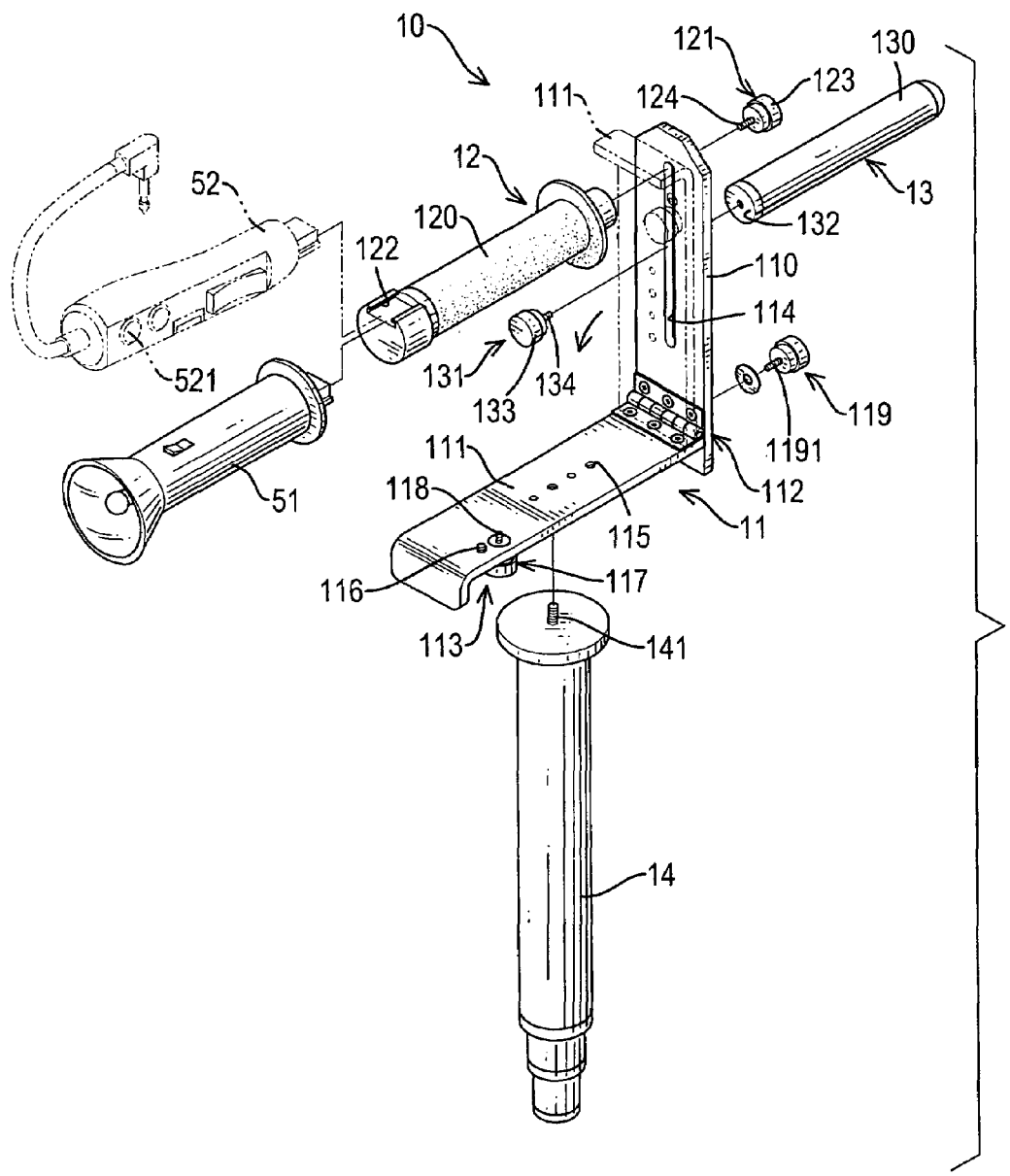
FIG. 1 is an exploded perspective view of an apparatus for supporting a video camera in accordance with the present invention.
Figure 2:
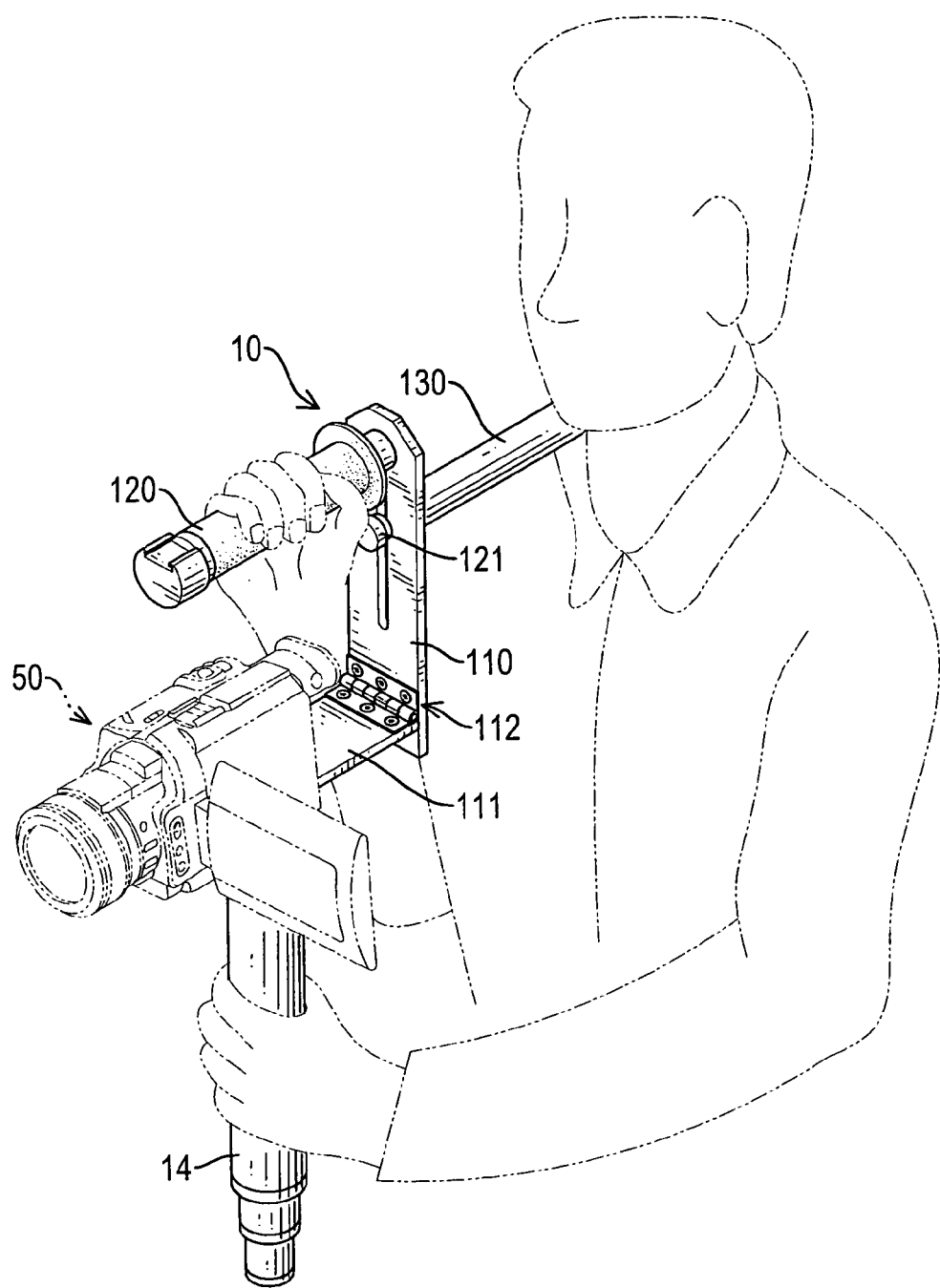
FIG. 2 is an operational perspective view of the apparatus in FIG. 1.

With reference to FIGS. 1 and 2, an apparatus (10) for supporting a video camera (50) in accordance with the present invention comprises a camera mounting bracket (11), a front handle assembly (12), a rear handle assembly (13) and a supplementary rod (14).

The camera mounting bracket (11) holds the camera (50), may have an L-shaped profile and comprises a handle mounting shelf (110), a camera mounting shelf (111), a hinge (112), a camera positioning device (113) and a camera mounting shelf retainer (119).

The handle mounting shelf (110) is a long thin flat piece and has a top end (not numbered), a bottom end (not numbered), a front (not numbered), a rear (not numbered) and an elongated slot (114). The elongated slot (114) is defined completely through the front and extends from the top end to the bottom end.

The camera mounting shelf (111) is a long thin flat piece and is pivotally mounted on the front of the handle mounting shelf (110) with the hinge (112) fitted between the bottom end and the elongated slot (114). The camera mounting shelf (111) is foldable relative to the handle mounting shelf (110) because of the hinge (112). The folded camera mounting shelf (111) will reduce the entire size of the camera mounting bracket (11) to save storage space when not in use and make the apparatus (10) convenient to transport. The camera mounting shelf (111) has a top (not numbered), a bottom (not numbered), a front end (not numbered) and multiple threaded holes (115). The front end of the camera mounting shelf (111) is opposite to the handle mounting shelf (110). The threaded holes (115) are defined completely through the top of the camera mounting shelf (111).

The camera positioning device (113) is mounted at the front end of the camera mounting shelf (111) to hold the video camera (50) on the camera mounting shelf (111) and comprises a nub (116) and a fastener (117). The nub (116) is formed on the top of the camera mounting shelf (111). The fastener (117) is rotatably held in the camera mounting shelf (111) and has a threaded shaft (118) extending from the top of the camera mounting shelf (111).

The camera mounting shelf retainer (119) is mounted on the rear of the handle mounting shelf (110) and has a threaded shaft (1191) that screws through the handle mounting shelf (110) and into the camera mounting shelf (111) to tighten and position the camera mounting shelf (111) with the handle mounting shelf (110).

The front handle assembly (12) is demountably mounted on the handle mounting shelf (110) and comprises a front handle (120) and a front handle retainer (121). The front handle (120) is demountably mounted on the front of the handle mounting shelf (110) and has a front end, a rear end and a connection slot (122). The rear end is demountably mounted to the front of the handle mounting shelf (110) and is aligned with the elongated slot (114). The connection slot (122) is defined at the front end so that a light source (51) or a microphone (52) can be connected to the front handle (120) through the connection slot (122). The microphone (52) may have multiple control keys (521) connected to the video camera (50) to conveniently operate the video camera (50).

The front handle retainer (121) is used to tighten the rear end of the front handle (120) on the handle mounting shelf (110) and comprises a disk (123) and a threaded shaft (124). The threaded shaft (124) is attached to the disk (123), extends into the elongated slot (114) at the rear of the handle mounting shelf (110) and screws into the rear end of the front handle (120) to tighten the front handle (120) on the handle mounting shelf (110).

The rear handle assembly (13) is demountably mounted on the handle mounting shelf (110) between the front handle (120) and the camera mounting shelf (111) and comprises a rear handle (130) and a rear handle retainer (131). The rear handle (130) is demountably mounted on the rear of the handle mounting shelf (110) and has a front end (132). The front end (132) is demountably mounted to the rear of the handle mounting shelf (110) and is aligned with the elongated slot (114).

The rear handle retainer (131) is used to tighten the front end (132) of the rear handle (130) on the handle mounting shelf (110) and comprises a disk (133) and a threaded shaft (134). The threaded shaft (134) is attached to the disk (133), extends into the elongated slot (114) at the front of the handle mounting shelf (110) and screws into the front end (132) of the rear handle (130) to tighten the rear handle (130) on the handle mounting shelf (110).

The supplementary rod (14) is demountably attached to the bottom of the camera mounting shelf (111), and may be a telescopic rod with a top having a threaded stud (141). The threaded stud (141) screws selectively into one of the threaded holes (115) to attach the supplementary rod (14) with the camera mounting shelf (111).

Therefore, both the front handle (120) and the rear handle (103) can be adjusted in their positions on the handle mounting shelf (110) if the retainers (121, 131) are loosened. The supplementary rod (14) can be adjusted in its position on the camera mounting shelf (111) by selecting and screwing the threaded stud (141) into a required one of the threaded holes (115).

A person can hold both the front handle (120) and the supplementary rod (14) with and rest the rear handle (103) on the shoulder when using the video camera (50) to obtain motion pictures. The apparatus (10) will provide a stable support for the video camera (50) and reduce arm muscle strain when the video camera (50) has been held for some time.

Figure 3:
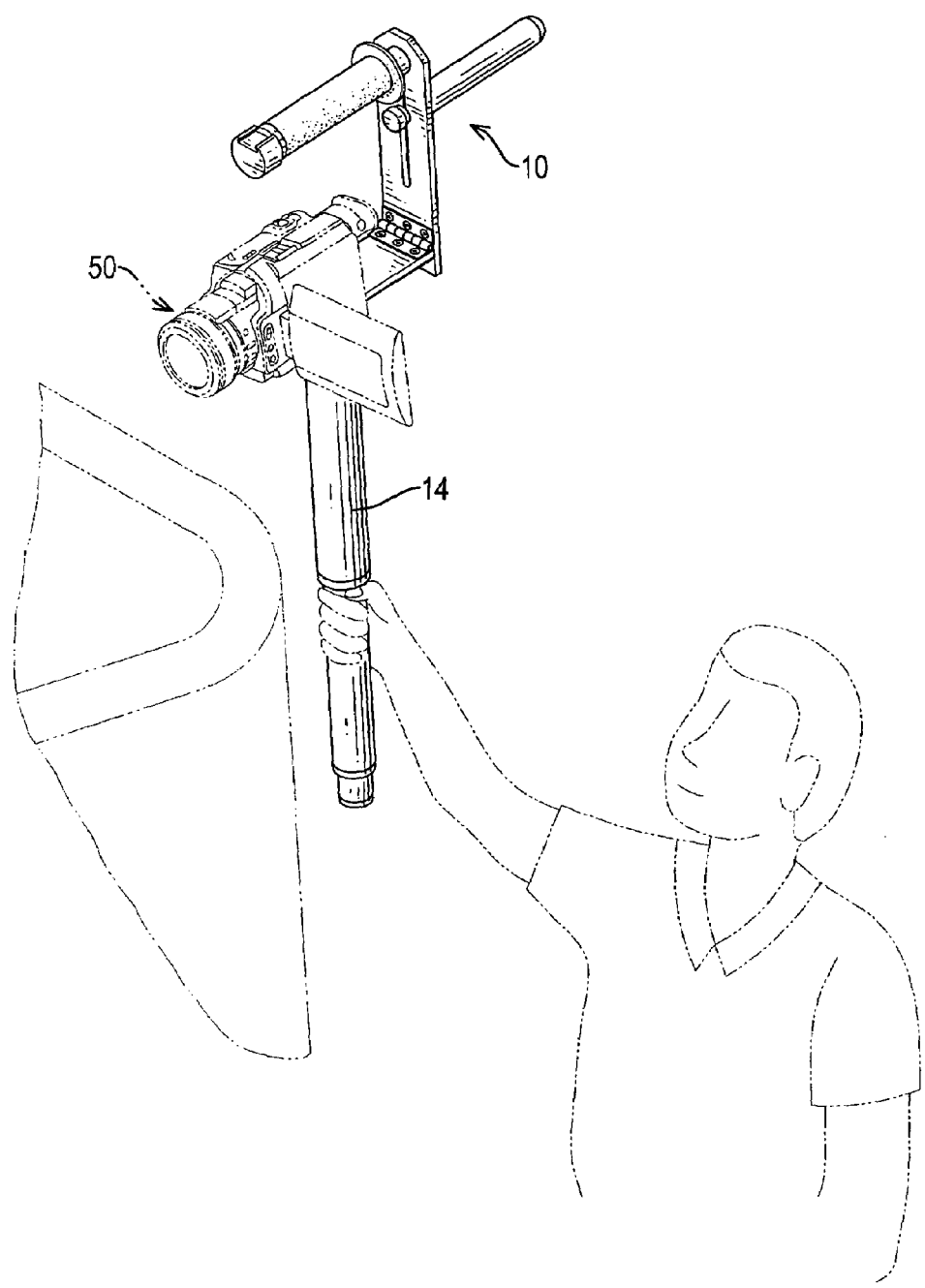
FIG. 3 is an operational perspective view of the apparatus in FIG. 1 when a person lifts up the video camera through a supplementary rod.

With further reference to FIG. 3, the person can lift the video camera (50) through the supplementary rod (14) to acquire high views with the video camera (50). Thus, the apparatus (10) will be able to accommodate different situations and terrain.

Figure 4:
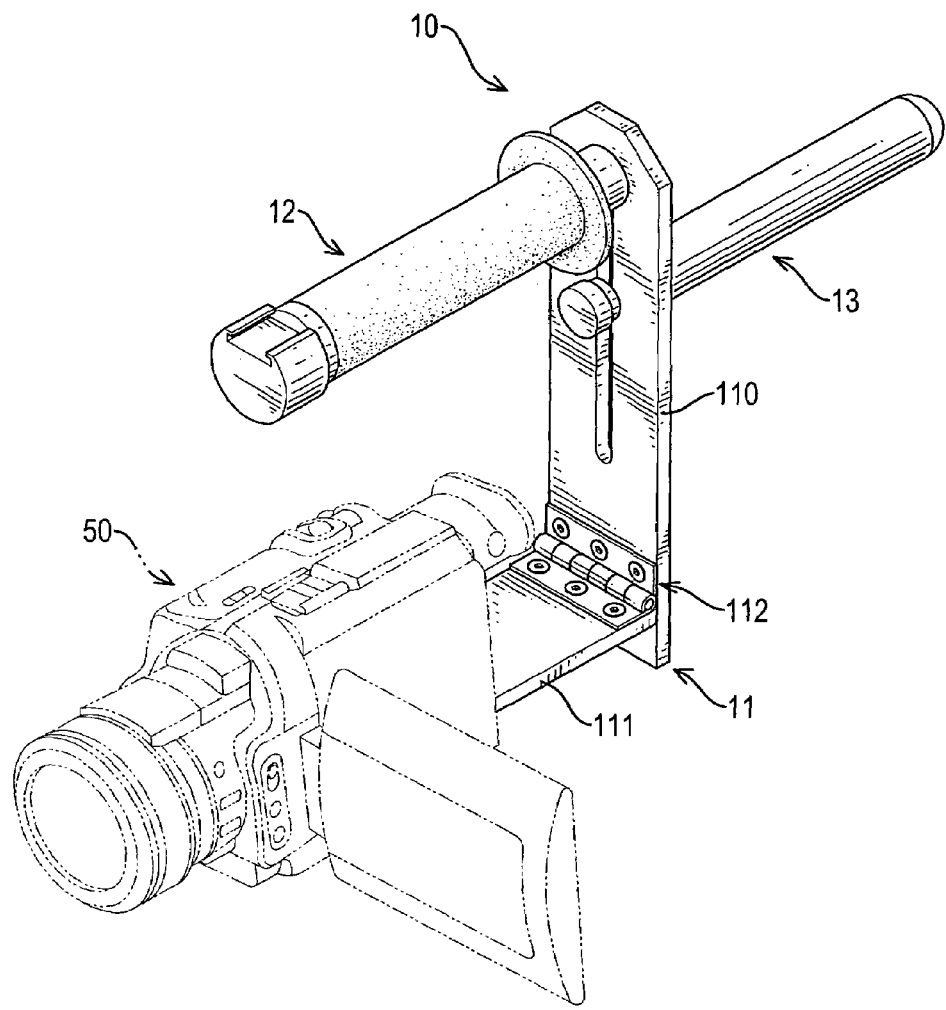
FIG. 4 is an operational perspective view of the apparatus in FIG. 1 without using a supplementary rod.
Figure 5:
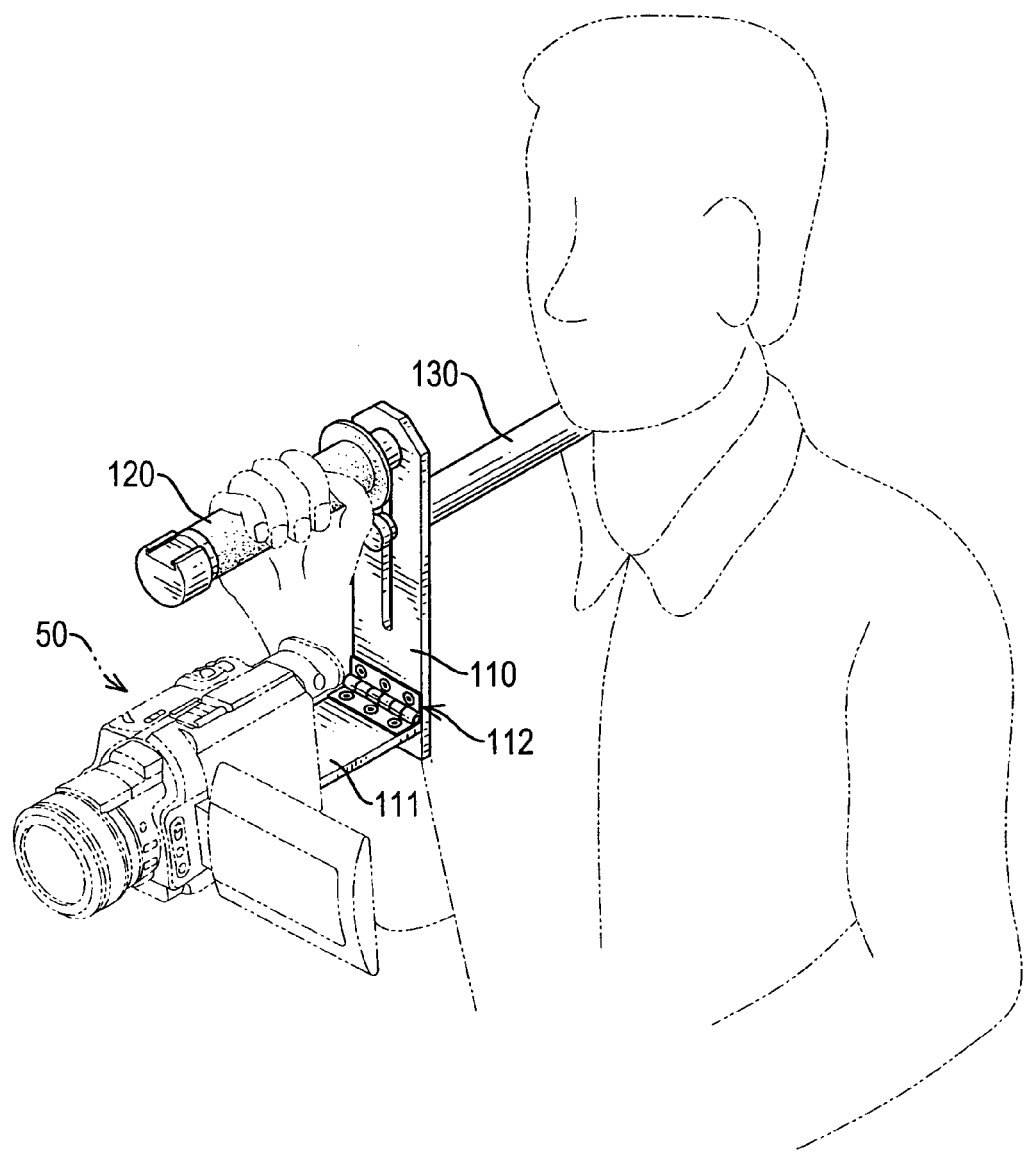
FIG. 5 is an operational perspective view of the apparatus when a person holds the apparatus in FIG. 4 that supports a video camera.
Figure 6:
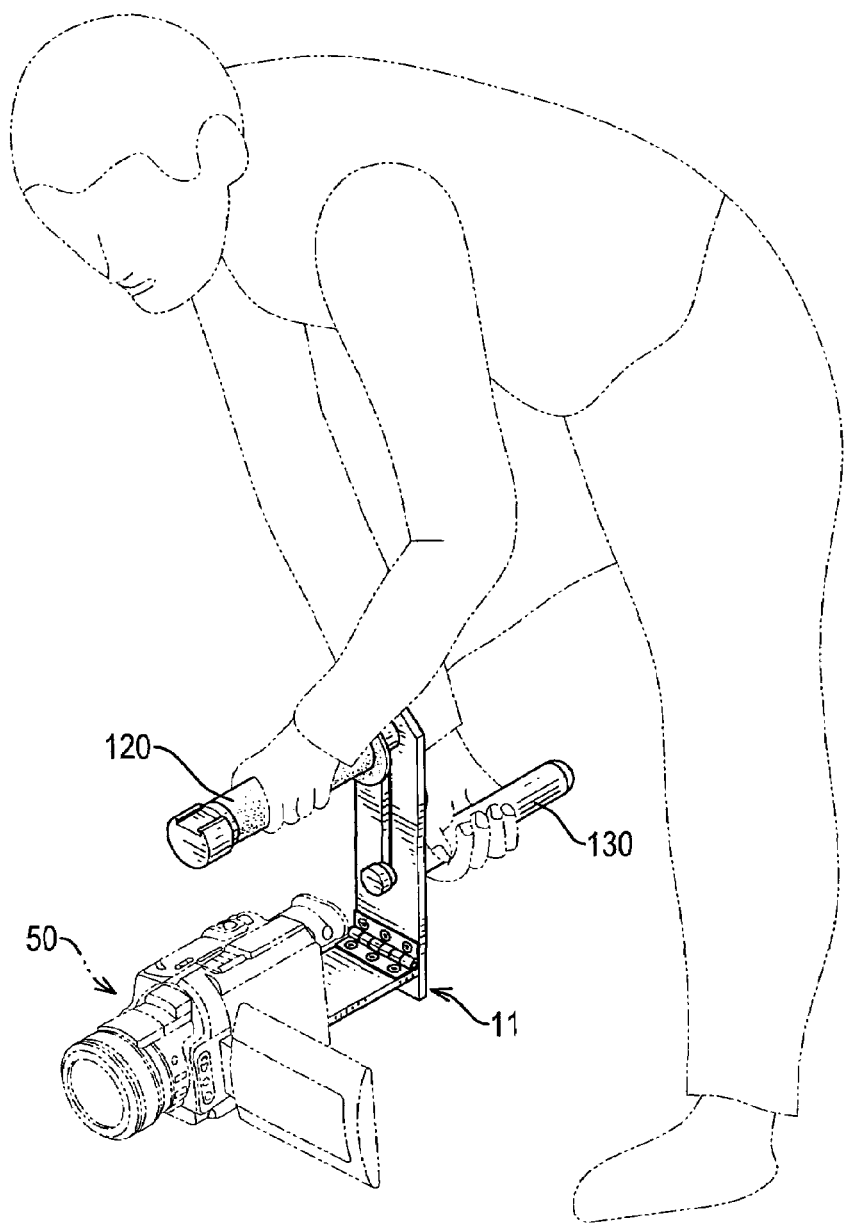
FIG. 6 is an operational perspective view of the apparatus in FIG. 4 when a person uses the apparatus to hold a video camera to record video a scene from a lower view.

With reference to FIGS. 4 to 6, the apparatus (10) can be used without the supplementary rod (14) for different requirements, such as a person can hold the front handle (120) with one hand and rest the rear handle (130) on the shoulder to maintain the video camera (50) stable when using the video camera (50) to obtain motion pictures. The person can hold both the front and the rear handles (120, 130) when using the video camera (50) to take lower views of something on the ground.

Figure 7:
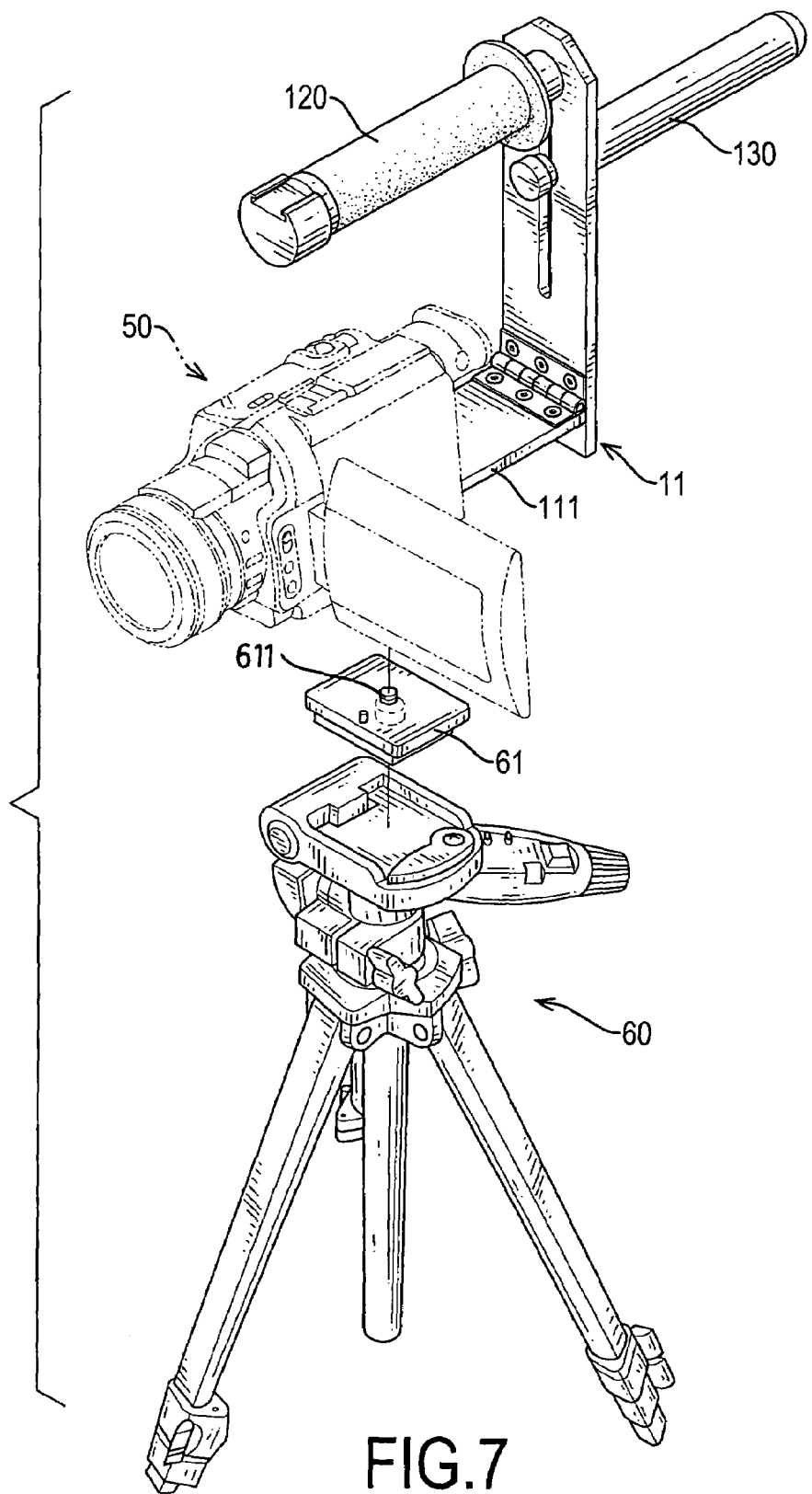
FIG. 7 is an operational perspective view of the apparatus in FIG. 4 when the apparatus connects to a tripod.

With reference to FIG. 7, the apparatus (10) can be connected to a tripod (60) through an adapter platform (61). The adapter platform (61) has a threaded stud (611) that screws into and is held in one of the threaded holes (115) in the camera mounting shelf (111).

Figure 8:
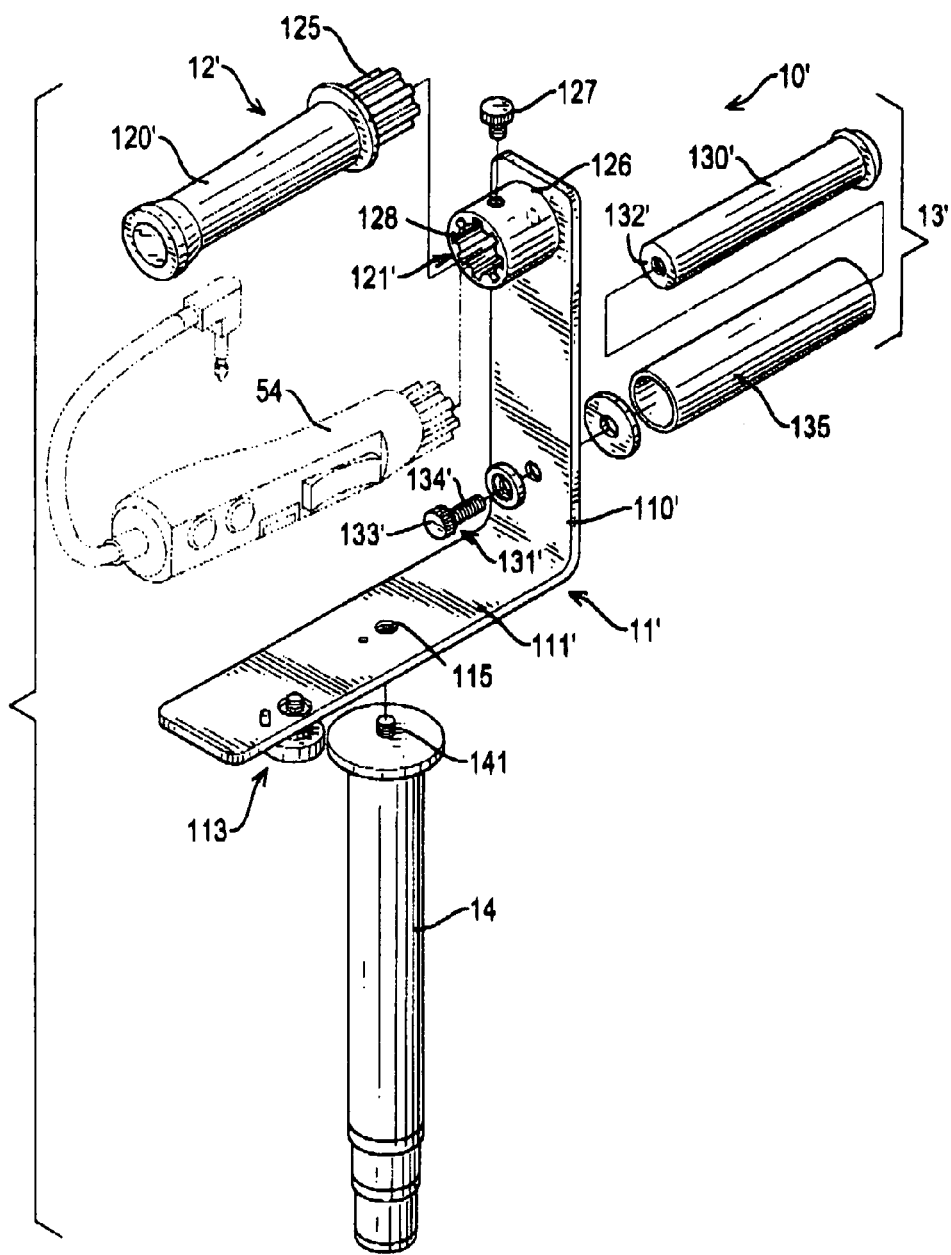
FIG. 8 is an exploded perspective view of a second embodiment of an apparatus for supporting a video camera in accordance with the present invention.

With reference to FIG. 8, a second embodiment of the apparatus (10') in accordance with the present invention a apparatus (10) in accordance with the present invention comprises a camera mounting bracket (11'), a front handle assembly (12'), a rear handle assembly (13') and a supplementary rod (14).

The camera mounting bracket (11') may have an L-shaped profile and comprises a handle mounting shelf (110'), a camera mounting shelf (111') and a camera positioning device (113).

The handle mounting shelf (110') is a long thin flat piece and has a top end (not numbered), a bottom end (not numbered), a front (not numbered) and a rear (not numbered).

The camera mounting shelf (111') is a long thin flat piece and is integrally mounted on the front of the handle mounting shelf (110') at the bottom end. The camera mounting shelf (111') has a top (not numbered), a bottom (not numbered), a front end (not numbered) and at least one threaded hole (115). The front of the camera mounting shelf (111') is opposite to the handle mounting shelf (110'). The threaded hole (115) is defined completely through the top of the camera mounting shelf (111').

The camera positioning device (113) is mounted at the front end of the camera mounting shelf (111') and comprises a nub (116) and a fastener (117) that are configured in a manner as previously described.

The front handle assembly (121') is demountably mounted on the handle mounting shelf (110') and comprises a front handle (120') and a front handle retainer (121'). The front handle (120') is demountably mounted on the front of the handle mounting shelf (110') and has a front end and a rear end. The rear end has multiple radial ribs (125).

The front handle retainer (121') holds the rear end of the front handle (120') on the handle mounting shelf (110') and comprises a stationary seat (126) and a fastener (127). The stationary seat (126) is formed at the top end of the handle mounting shelf (110') and has a toothed recess (128). The rear end of the front handle (120') is fitted into the toothed recess (128) with the radial ribs (125) engage the toothed recess (128) to keep the front handle (120') from slipping relative to the stationary seat (126). The fastener (127) tightens the rear end of the front handle (120') in the stationary seat (126).

The front handle (120') can be removed from the stationary seat (126) to replace a microphone (54) or a light source to accommodate for different applications.

The rear handle assembly (13') is demountably mounted on the handle mounting shelf (110') at a position between the front handle (120') and the camera mounting shelf (111') and comprises a rear handle (130'), a rear handle retainer (131') and a rear handle sleeve (135). The rear handle (130') is demountably mounted on the rear of the handle mounting shelf (110') and has a front end (132'). The front end (132') is mounted to the rear of the handle mounting shelf (110').

The rear handle sleeve (135) is a hollow tubing and is mounted around and holds rotatably the rear handle (130') inside.

The rear handle retainer (131') tightens the front end (132') of the rear handle (130') on the handle mounting shelf (110') and comprises a disk (133') and a threaded shaft (134'). The threaded shaft (134') is attached to the disk (133') and screws into the front end (132') of the rear handle (130') to tighten the rear handle (130') on the handle mounting shelf (110').

The supplementary rod (14) is demountably attached to the bottom of the mounted shelf (111'), and may be a telescopic rod with a top having a threaded stud (141) that screws selectively into one of the threaded holes (115) to attach the supplementary rod (14) to the camera mounting shelf (111').

Consequently, the present invention will aid the person to hold firmly the camera video (50) regardless of high positions or low positions. In addition, the present invention will reduce arm strain when the person holds the video camera (50) to record video during a long period.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. An apparatus for supporting a video camera, the apparatus comprising:
   (a) a camera mounting bracket comprising
      a handle mounting shelf with a top end, a bottom end, a front and a rear, the handle mounting shelf having an elongated slot defined completely through the handle mounting shelf and extended adjacent to the top end and adjacent to the bottom end;
      a camera mounting shelf attached to the front at the bottom end of the handle mounting shelf to mount the video camera and having a front end opposite to the handle mounting shelf; and
      a camera positioning device mounted on the camera mounting shelf at the front end of the camera mounting shelf;
   (b) a front handle assembly demountably mounted on the handle mounting shelf and comprising a front handle demountably mounted on the front of the handle mounting shelf, the front handle assembly having a front handle retainer mounted on the rear of the handle mounting shelf and including a first disk and a first threaded shaft attached to the disk, the first threaded shaft extending into the elongated slot and screwing into the front handle; and
   (c) a rear handle assembly demountably mounted on the handle mounting shelf between the front handle and the camera mounting shelf and comprising a rear handle demountably mounted on the rear of the handle mounting shelf, the rear handle assembly having a rear handle retainer mounted on the front of the handle mounting shelf and including a second disk and a second threaded shaft attached to the second disk of the rear handle retainer, the second threaded shaft extending into the elongated slot in the handle mounting shelf and screwing into the rear handle.

2. The apparatus for supporting a video camera as claimed in claim 1, wherein the camera mounting bracket further comprises
   a hinge mounted at the bottom end of the handle mounting shelf to connect pivotally the camera mounting shelf on the handle mounting shelf; and
   a camera mounting shelf retainer mounted on the rear of the handle mounting shelf and having a threaded shaft screwing through the handle mounting shelf and into the camera mounting shelf to tighten and position the camera mounting shelf relative to the handle mounting shelf.

3. An apparatus for supporting a video camera, comprising:
   (a) a camera mounting bracket, the camera bracket including:
      a handle mounting shelf with a top end, a bottom end, a front and a rear;
      a camera mounting shelf attached to the front at the bottom end of the handle mounting shelf to mount the video camera and having a front end opposite to the handle mounting shelf; and
      a camera positioning device mounted on the camera mounting shelf at the front end of the camera mounting shelf;
   (b) a front handle assembly demountably mounted on the handle mounting shelf and including a front handle demountably mounted on the front of the handle mounting shelf, the front handle further has a front end and a connection slot defined at the front end; and
   (c) a rear handle assembly demountably mounted on the handle mounting shelf between the front handle and the camera mounting shelf and comprising a rear handle demountably mounted on the rear of the handle mounting shelf.

4. An apparatus for supporting a video camera, comprising:
   (a) a camera mounting bracket, the camera bracket including:
      a handle mounting shelf with a top end, a bottom end, a front and a rear;
      a camera mounting shelf attached to the front at the bottom end of the handle mounting shelf to mount the video camera and having a front end opposite to the handle mounting shelf; and
      a camera positioning device mounted on the camera mounting shelf at the front end of the camera mounting shelf;
   (b) a front handle assembly demountably mounted on the handle mounting shelf and including a front handle demountably mounted on the front of the handle mounting shelf;
   (c) a rear handle assembly demountably mounted on the handle mounting shelf between the front handle and the camera mounting shelf and comprising a rear handle demountably mounted on the rear of the handle mounting shelf; and
   (d) a supplementary rod attached to the camera mounting shelf.

5. The apparatus for supporting a video camera as claimed in claim 4, wherein
   the camera mounting shelf further has a top, a bottom and at least one threaded hole defined completely through the top; and
   the supplementary rod is a telescopic rod attached to bottom of the camera mounting shelf and has a top with a threaded stud screwing selectively into one of the at least one threaded hole in the camera mounting shelf.

6. The apparatus for supporting a video camera as claimed in claim 5, wherein the camera positioning device comprises a nub formed on the top of the camera mounting shelf and a fastener rotatably held in the camera mounting shelf and comprising a threaded shaft extending from the top of the camera mounting shelf.

* * * * *